United States Patent
Seo et al.

(10) Patent No.: US 10,334,597 B2
(45) Date of Patent: Jun. 25, 2019

(54) METHOD FOR TRANSMITTING AND RECEIVING SIGNAL IN WIRELESS COMMUNICATION SYSTEM SUPPORTING DEVICE-TO-DEVICE COMMUNICATION AND APPARATUS THEREFOR

(71) Applicant: LG Electronics Inc., Seoul (KR)

(72) Inventors: Hanbyul Seo, Seoul (KR); Hakseong Kim, Seoul (KR); Joonkui Ahn, Seoul (KR)

(73) Assignee: LG ELECTRONICS INC., Seoul (KR)

(*) Notice: Subject to any disclaimer, the term of this patent is extended or adjusted under 35 U.S.C. 154(b) by 144 days.

(21) Appl. No.: 15/123,580

(22) PCT Filed: Mar. 30, 2015

(86) PCT No.: PCT/KR2015/003101
§ 371 (c)(1),
(2) Date: Sep. 2, 2016

(87) PCT Pub. No.: WO2015/147608
PCT Pub. Date: Oct. 1, 2015

(65) Prior Publication Data
US 2017/0079035 A1    Mar. 16, 2017

Related U.S. Application Data

(60) Provisional application No. 61/971,543, filed on Mar. 28, 2014, provisional application No. 62/041,634, filed on Aug. 25, 2014.

(51) Int. Cl.
*H04W 72/04* (2009.01)
*H04W 72/12* (2009.01)
(Continued)

(52) U.S. Cl.
CPC ... *H04W 72/0453* (2013.01); *H04W 72/0446* (2013.01); *H04W 72/1242* (2013.01); *H04W 8/005* (2013.01); *H04W 92/18* (2013.01)

(58) Field of Classification Search
None
See application file for complete search history.

(56) References Cited

U.S. PATENT DOCUMENTS

2015/0173048 A1* 6/2015 Seo .............. H04W 72/1247
                                                      370/329
2015/0208440 A1* 7/2015 Agiwal ............ H04W 74/085
                                                      370/329
(Continued)

FOREIGN PATENT DOCUMENTS

WO    WO 2013/181394 A1    12/2013
WO    WO 2013/191360 A1    12/2013
WO    WO 2015/111935 A1     7/2015

OTHER PUBLICATIONS

LG Electronics, "Issues in Signal Transmissions and Receptions in D2D Operations," 3GPP TSG RAN WG1 Meeting #74, R1-133389, Barcelona, Spain, Aug. 19-23, 2013 (Downloaded by EPO on Aug. 10, 2013), 6 pages.

(Continued)

*Primary Examiner* — George C Atkins
(74) *Attorney, Agent, or Firm* — Birch, Stewart, Kolasch & Birch, LLP

(57) ABSTRACT

The present invention provides a method for transmitting and receiving a signal for device-to-device (D2D) communication and an apparatus therefor, which are used in a wireless access system supporting D2D communication. A method for a device transmitting and receiving a signal according to one aspect of the present invention may comprise the steps of: identifying signals that are scheduled for a particular subframe configured for D2D transmission and (Continued)

reception; determining whether the scheduled signals overlap; and transmitting the scheduled signals on the basis of a pre-determined priority if the scheduled signals overlap. To this end, the priority may be determined based on the type of signal. More preferably, the priority may be determined in the order of a synchronization signal, a D2D communication signal and a D2D discovery signal.

8 Claims, 13 Drawing Sheets

(51) Int. Cl.
*H04W 8/00* (2009.01)
*H04W 92/18* (2009.01)

(56) References Cited

U.S. PATENT DOCUMENTS

| | | | | |
|---|---|---|---|---|
| 2016/0066356 A1* | 3/2016 | Lindoff | ............... | H04W 52/383 370/329 |
| 2016/0142898 A1* | 5/2016 | Poitau | ................... | H04W 76/14 370/329 |
| 2016/0143050 A1* | 5/2016 | Saiwai | .............. | H04W 72/1263 370/329 |
| 2016/0183276 A1* | 6/2016 | Marinier | ............... | H04W 72/02 370/329 |
| 2016/0219509 A1* | 7/2016 | Fujishiro | ................ | H04W 52/34 |
| 2016/0227496 A1* | 8/2016 | Panteleev | ............ | H04W 76/18 |
| 2016/0262111 A1* | 9/2016 | Boudreau | ............ | H04W 76/14 |
| 2017/0013640 A1* | 1/2017 | Loehr | ................... | H04W 76/14 |
| 2018/0176871 A1* | 6/2018 | Li | ......................... | H04W 72/02 |

OTHER PUBLICATIONS

LG Electronics, "Multiplexing of Uu and D2D communication," 3GPP TSG RAN WG1 Meeting #76, R1-140335, Prague, Czech Republic, Feb. 10-14, 2014 (Downloaded by EPO on Feb. 9, 2014), pp. 1-7.

LG Electronics, "Multiplexing of Uu and D2D discovery signal," 3GPP TSG RAN WG1 Meeting #76, R1-140338, Prague, Czech Republic, Feb. 10-14, 2014 (Downloaded by EPO on Feb. 9, 2014), pp. 1-4.

LG Electronics, "Control design for D2D broadcast communication," 3GPP TSG RAN WG1 Meeting #76bis, R1-141349, Shenzhen, China, Mar. 31-Apr. 4, 2014, pp. 1-6.

LG Electronics, "Discussion on D2D Synchronization Procedure," 3GPP TSG RAN WG1 Meeting #76, R1-140330, Prague, Czech Republic, Feb. 10-14, 2014, pp. 1-7.

LG Electronics, "Issues on multiplexing of WAN and D2D," 3GPP TSG RAN WG1 Meeting #76bis, R1-141354, Shenzhen, China, Mar. 31-Apr. 4, 2014, pp. 1-10.

* cited by examiner

FIG. 2
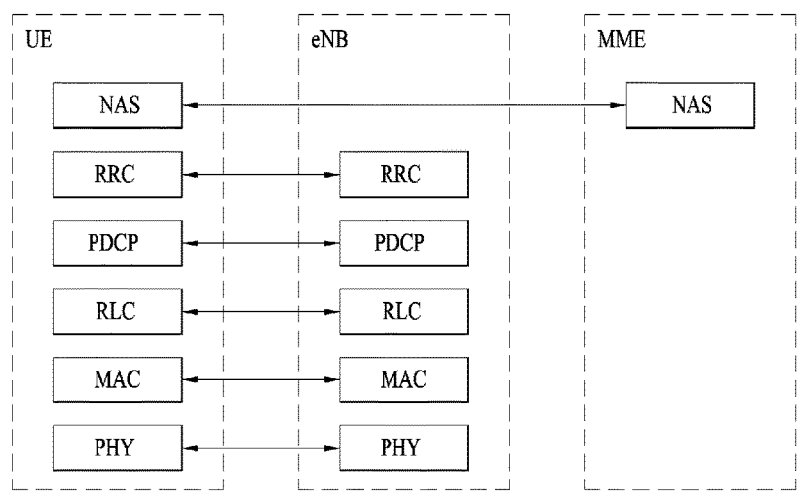
(a) Control-plane protocol stack
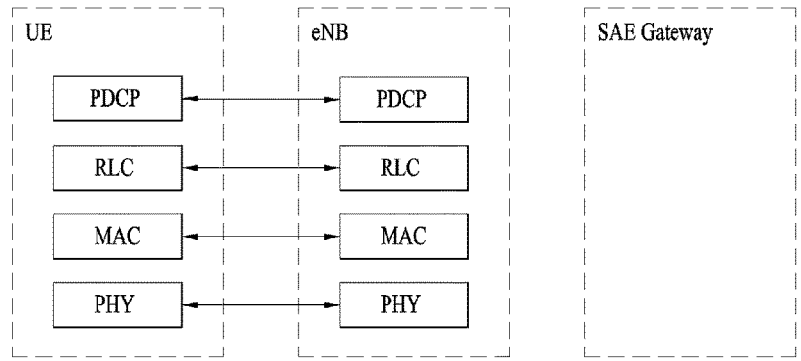
(b) User-plane protocol stack

METHOD FOR TRANSMITTING AND RECEIVING SIGNAL IN WIRELESS COMMUNICATION SYSTEM SUPPORTING DEVICE-TO-DEVICE COMMUNICATION AND APPARATUS THEREFOR

CROSS REFERENCE TO RELATED APPLICATIONS

This application is the National Phase of PCT International Application No. PCT/KR2015/003101, filed on Mar. 30, 2015, which claims priority under 35 U.S.C. 119(e) to U.S. Provisional Application Nos. 61/971,543, filed on Mar. 28, 2014, and 62/041,634, filed on Aug. 25, 2014, all of which are hereby expressly incorporated by reference into the present application.

TECHNICAL FIELD

The present invention relates to a wireless communication system, and more particularly, to a method for transmitting and receiving signals in a wireless communication system supporting device-to-device (D2D) communication and apparatus therefor.

BACKGROUND ART

A structure of a 3GPP LTE (3rd Generation Partnership Project Long Term Evolution; hereinafter, referred as "LTE") system which is an example of a wireless communication system to which the present invention may be applied will be described.

FIG. 1 illustrates a schematic structure a network structure of an evolved universal mobile telecommunication system (E-UMTS). An E-UMTS system is an evolved version of the UMTS system and basic standardization thereof is in progress under the 3rd Generation Partnership Project (3GPP). The E-UMTS is also referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist for one BS. The cell provides a downlink or uplink transmission service to several UEs using any one of bandwidths of 1.25, 2.5, 5, 10, 15 and 20 MHz. Different cells may be set to provide different bandwidths. A BS controls data transmission or reception to or from a plurality of UEs. The BS transmits downlink scheduling information to a UE with respect to downlink (DL) data so as to inform the UE of time/frequency domain, coding, data size, Hybrid Automatic Repeat and reQuest (HARQ) associated information of data to be transmitted, or the like. The BS transmits uplink scheduling information to a UE with respect to uplink (UL) data so as to inform the UE of time/frequency domain, coding, data size, HARQ associated information used by the UE, or the like. An interface for transmitting user traffic or control traffic can be used between BSs. A Core Network (CN) may include the AG, a network node for user registration of the UE, or the like. The AG manages mobility of a UE on a Tracking Area (TA) basis. One TA includes a plurality of cells.

Wireless communication technology has been developed to reach the LTE based on Wideband Code Division Multiple Access (WCDMA), but demands and expectations of users and providers have continuously increased. In addition, since other aspects of wireless access technology continue to evolve, new advances are required to remain competitive in the future. There is a need for reduction in cost per bit, service availability increase, the use of a flexible frequency band, a simple structure and an open type interface, appropriate power consumption of a UE, etc.

DISCLOSURE OF THE INVENTION

Technical Task

The technical task of the present invention is to provide a method for transmitting and receiving signals in a wireless communication system supporting device-to-device (D2D) communication and apparatus therefor.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

The present invention is directed to a wireless access system supporting a device-to-device (D2D) communication and provides a method of transmitting and receiving signals for D2D communication and apparatus therefor.

In a first technical aspect of the present invention, provided herein is a method of transmitting and receiving signals by a user equipment, including: checking signals scheduled at a specific subframe configured for D2D transmission and reception; determining whether the scheduled signals overlap with each other; and transmitting, if the scheduled signals overlap with each other, the scheduled signals according to predetermined priority. In this case, the priority may be determined based on a type of signal. Preferably, the priority may be determined in an order of a synchronization signal, a D2D communication signal, and a D2D discovery signal.

In addition, transmitting the scheduled signals according to the predetermined priority may include transmitting a high priority signal and dropping transmission and reception of a signal overlapping with the high priority signal.

The method may further include detecting a neighboring signal transmitted and received at a neighboring user equipment and determining whether to transmit the scheduled signals by considering the priority. In this case, if the neighboring signal has priority higher than the scheduled signals, transmission and reception of the scheduled signals may be dropped.

In a second technical aspect of the present invention, provided herein is a user equipment for transmitting and receiving signals in a wireless communication system supporting D2D (device-to-device) communication, including: a transceiver module configured to transmit and receive signals; and a processor for supporting the D2D communication. The processor may be configured to check signals scheduled at a specific subframe configured for D2D transmission and reception, determine whether the scheduled signals overlap with each other, and transmit, if the scheduled signals overlap with each other, the scheduled signals according to predetermined priority. In this case, the priority may be determined based on a type of signal. Preferably, the priority may be determined in an order of a synchronization signal, a D2D communication signal, and a D2D discovery signal.

The operation of transmitting the scheduled signals according to the predetermined priority may include operations of transmitting a high priority signal and dropping transmission and reception of a signal overlapping with the high priority signal.

The processor may be configured to detect a neighboring signal transmitted and received at a neighboring user equipment and determine whether to transmit the scheduled signals by considering the priority. Further, if the neighboring signal has priority higher than the scheduled signals, the processor may be configured to drop transmission and reception of the scheduled signals.

The above aspects of the present invention are only a part of the preferred embodiments of the present invention, and various embodiments based on technical features of the present invention may be devised and understood by the person with ordinary skill in the art based on the detailed description of the present invention.

Advantageous Effects

According to the present invention, D2D (device-to-device) signals can be efficiently transceived in a wireless communication system.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 2 is a diagram of structures of control and user planes of a radio interface protocol between a user equipment and E-UTRAN based on the 3GPP radio access network standard.

BEST MODE FOR INVENTION

Figure 1:
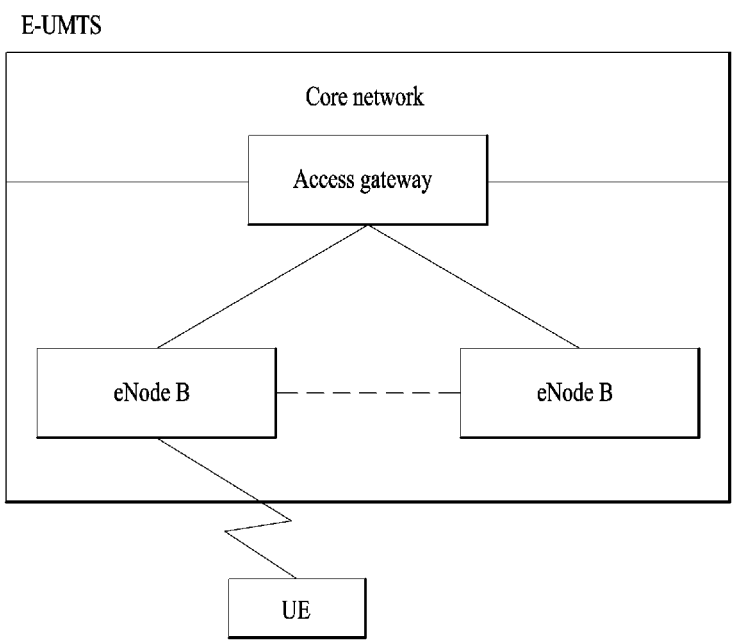
FIG. 1 is a schematic diagram of an E-UMTS network structure as one example of a wireless communication system.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. The CDMA may be embodied with wireless (or radio) technology such as UTRA (Universal Terrestrial Radio Access) or CDMA2000. The TDMA may be embodied with wireless (or radio) technology such as GSM (Global System for Mobile communications)/GPRS (General Packet Radio Service)/EDGE (Enhanced Data Rates for GSM Evolution). The OFDMA may be embodied with wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). The UTRA is a part of the UMTS (Universal Mobile Telecommunications System). The 3GPP (3rd Generation Partnership Project) LTE (long term evolution) is a part of the E-UMTS (Evolved UMTS), which uses E-UTRA. The 3GPP LTE employs the OFDMA in downlink and employs the SC-FDMA in uplink. The LTE-Advanced (LTE-A) is an evolved version of the 3GPP LTE. WiMAX can be explained by an IEEE 802.16e (WirelessMAN-OFDMA Reference System) and an advanced IEEE 802.16m (WirelessMAN-OFDMA Advanced System).

For clarity, the following description focuses on the 3GPP LTE and 3GPP LTE-A system. However, technical features of the present invention are not limited thereto.

FIG. 2 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a 1st layer, provides higher layers with an information transfer service using a physical channel. The physical layer is connected to a medium access control layer situated above via a transport channel (trans antenna port channel). Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a 2nd layer provides a service to a radio link control (hereinafter abbreviated RLC) layer, which is a higher layer, on a logical channel. The RLC layer of the 2nd layer supports a reliable data transmission. The function of the RLC layer may be implemented by a function block within the MAC. PDCP (packet data convergence protocol) layer of the 2nd layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a 3rd layer is defined on a control plane only. The RRC layer is responsible for control of logical channels, transport channels and physical channels in association with a configuration, a re-configuration and a release of radio bearers (hereinafter abbreviated RBs). The RB indicates a service provided by the 2nd layer for a data delivery between the user equipment and the network. To this end, the RRC layer of the user equipment and the RRC layer of the network exchange a RRC message with each other. In case that there is an RRC connection (RRC connected) between the user equipment and the RRC layer of the network, the user equipment lies in the state of RRC connected (connected mode). Otherwise, the user equipment lies in the state of RRC idle (idle mode). A non-access stratum (NAS) layer situated at the top of the RRC layer performs such a function as a session management, a mobility management and the like.

A single cell consisting of an eNode B (eNB) is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel). Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 3:
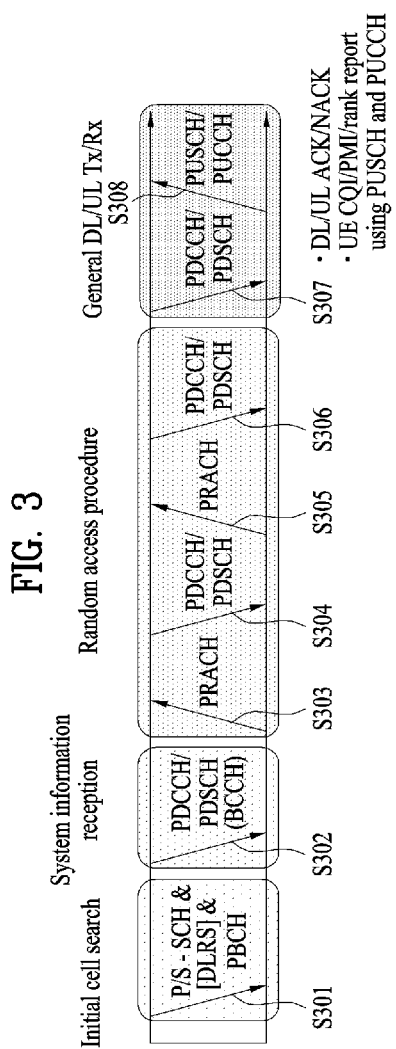
FIG. 3 is a diagram for explaining physical channels used in the 3GPP LTE system and a general signal transmission method using the same.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may then obtain information such as a cell ID and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain a detailed system information [S302].

Meanwhile, if a user equipment initially accesses an eNode B or does not have a radio resource for transmitting a signal, the user equipment may be able to perform a random access procedure to complete the access to the eNode B [S303 to S306]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose. Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 4:
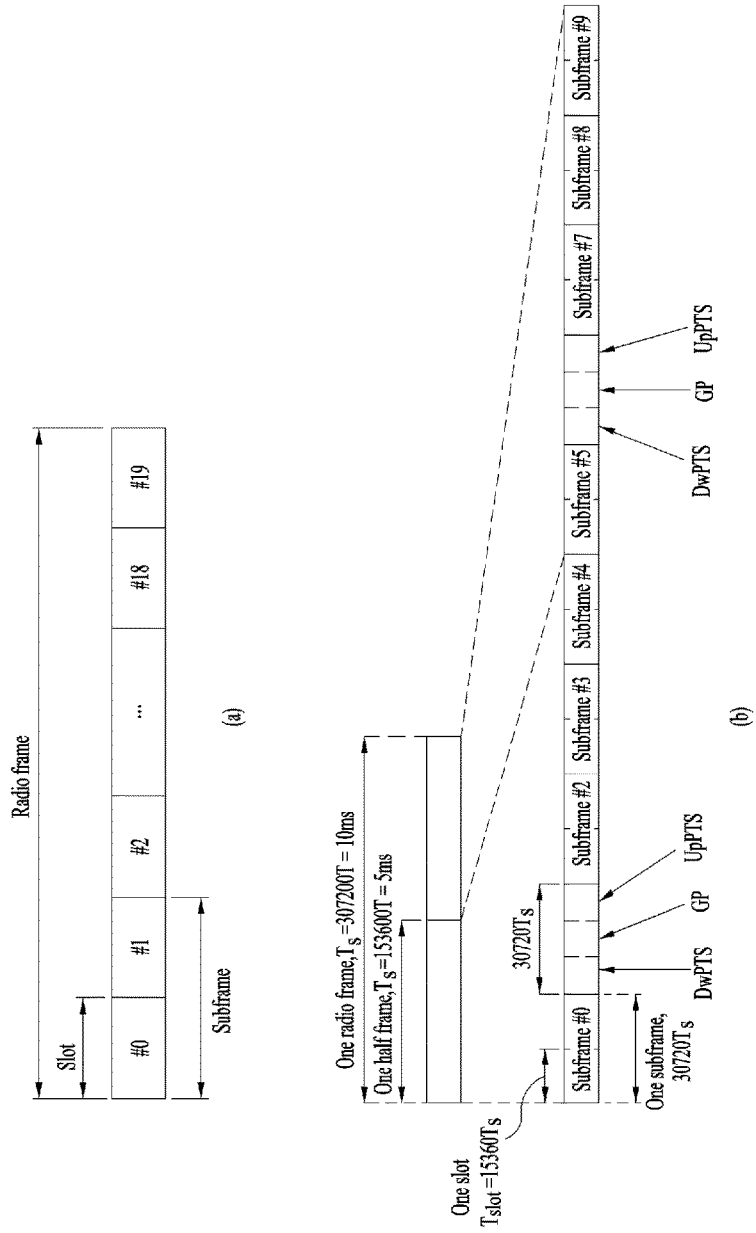
FIG. 4 is a diagram illustrating a structure of a radio frame used in the LTE system.

The structure of a radio frame of 3GPP LTE system will be described with reference to FIG. 4.

In a cellular Orthogonal Frequency Division Multiplexing (OFDM) radio packet communication system, uplink/downlink data packets are transmitted in subframes. One subframe is defined as a predetermined time interval including a plurality of OFDM symbols. The 3GPP LTE standard supports a type 1 radio frame structure applicable to Frequency Division Duplex (FDD) and a type 2 radio frame structure applicable to Time Division Duplex (TDD).

FIG. 4(a) illustrates the type-1 radio frame structure. A downlink radio frame is divided into ten subframes. Each subframe includes two slots in the time domain. The time taken to transmit one subframe is defined as a transmission time interval (TTI). For example, a subframe may have a duration of 1 ms and one slot may have a duration of 0.5 ms. A slot may include a plurality of OFDM symbols in the time domain and includes a plurality of resource blocks (RBs) in the frequency domain. Since 3GPP LTE adopts OFDMA for downlink, an OFDM symbol represents one symbol period. An OFDM symbol may be referred to as an SC-FDMA symbol or a symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, a slot may include 7 OFDM symbols. For an extended CP configuring each OFDM symbol, the duration of each OFDM symbol extends and thus the number of OFDM symbols included in a slot is smaller than in the case of the normal CP. For the extended CP, a slot may include, for example, 6 OFDM symbols. When a channel status is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other three OFDM symbols may be allocated to a physical downlink shared channel (PDSCH).

FIG. 4(b) illustrates the type-2 radio frame structure. The type-2 radio frame includes two half frames, each of which has 5 subframes, a downlink pilot time slot (DwPTS), a guard period (GP), and an uplink pilot time slot (UpPTS). Each subframe includes two slots.

The DwPTS is used for initial cell search, synchronization, or channel estimation in a UE, whereas the UpPTS is used for channel estimation in an eNB and UL transmission synchronization in a UE. The GP is provided to eliminate interference taking place in UL due to multipath delay of a DL signal between DL and UL. Regardless of the type of a radio frame, a subframe of the radio frame includes two slots.

The current 3GPP standard document defines configuration of the special subframe as shown in Table 2 below. Table 2 shows DwPTS and UpPTS given when $TS=1/(15000*2048)$, and the other region is configured as a GP.

TABLE 1

| | | Normal cyclic prefix in downlink | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — | n the LTE TDD system, uplink/downlink subframe configurations (UL/DL configurations) are given as shown in Table 1 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe, and S denotes the special subframe. Table 1 also shows downlink-to-uplink switch-point periodicity in uplink/downlink subframe configuration of each system.

Figure 5:
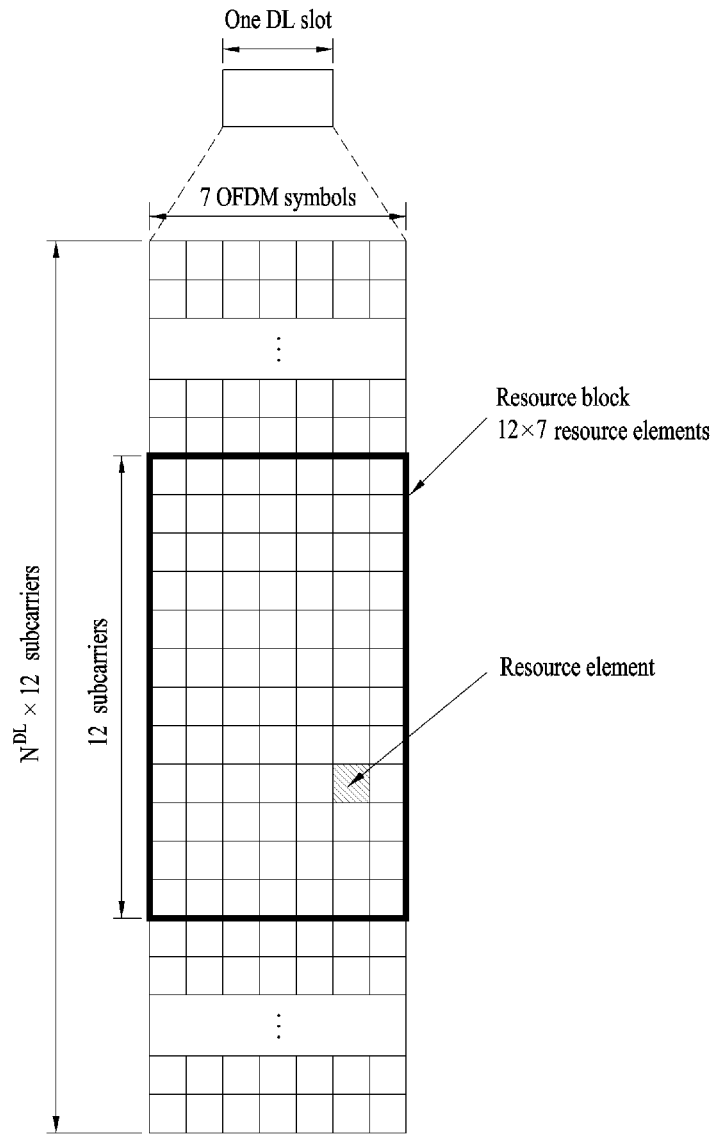
FIG. 5 is a diagram illustrating a resource grid for a downlink slot.

The structure of the above radio frame is just an example, The number of, subframes included in the radio frame, the number of slots included in a subframe, or the number of symbols included in a slot can be changed FIG. 5 is a diagram illustrating a resource grid for a downlink slot.

Referring to FIG. 5, a DL slot includes $N_{symb}^{DL}$ OFDM symbols in the time domain and $N_{RB}^{DL}$ resource blocks in the frequency domain. Since each resource block includes $N_{sc}^{RB}$ subcarriers, the DL slot includes $N_{RB}^{DL} \times N_{sc}^{RB}$ subcarriers in the frequency domain. Although FIG. 5 illustrates that the DL slot includes seven OFDM symbols and the resource block includes twelve subcarriers, it is to be understood that the downlink slot and the resource block are not limited thereto. For example, the number of OFDM symbols included in the downlink slot may be varied depending on a length of CP (cyclic prefix).

Each element on the resource grid is referred to as a resource element (RE). One resource element is indicated by one OFDM symbol index and one subcarrier index. One RB includes $N_{symb}^{DL} \times N_{sc}^{RB}$ number of REs. The number $N_{RB}^{DL}$ of RBs included in the DL slot depends on a DL transmission bandwidth configured in a cell.

Figure 6:
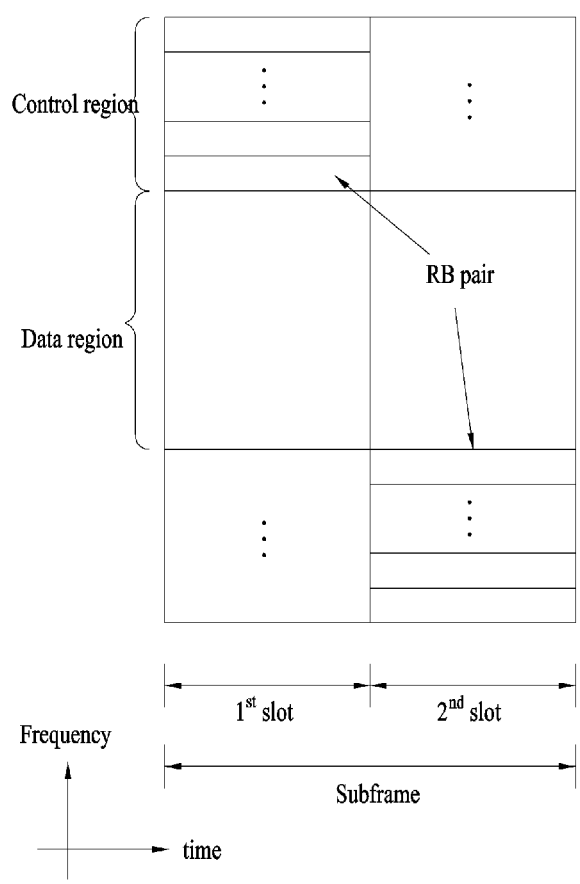
FIG. 6 is a diagram illustrating a structure of a downlink subframe.

FIG. 6 illustrates a structure of an uplink subframe applicable to embodiments of the present invention.

Referring to FIG. 6, a UL subframe may be divided into a control region and a data region in the frequency domain. A PUCCH for carrying uplink control information is allocated to the control region and a PUSCH for carrying user data is allocated to the data region. In the LTE system, a UE does not simultaneously transmit the PUCCH and the PUSCH to maintain a single carrier property. However, in the LTE-A system, a PUCCH signal and a PUSCH signal can be simultaneously transmitted due to the introduction of carrier aggregation technology. The PUCCH for one UE is allocated to an RB pair in a subframe. RBs belonging to the RB pair occupy different subcarriers in respective two slots. This is called that the RB pair allocated to the PUCCH is frequency-hopped in a slot boundary.

Figure 7:
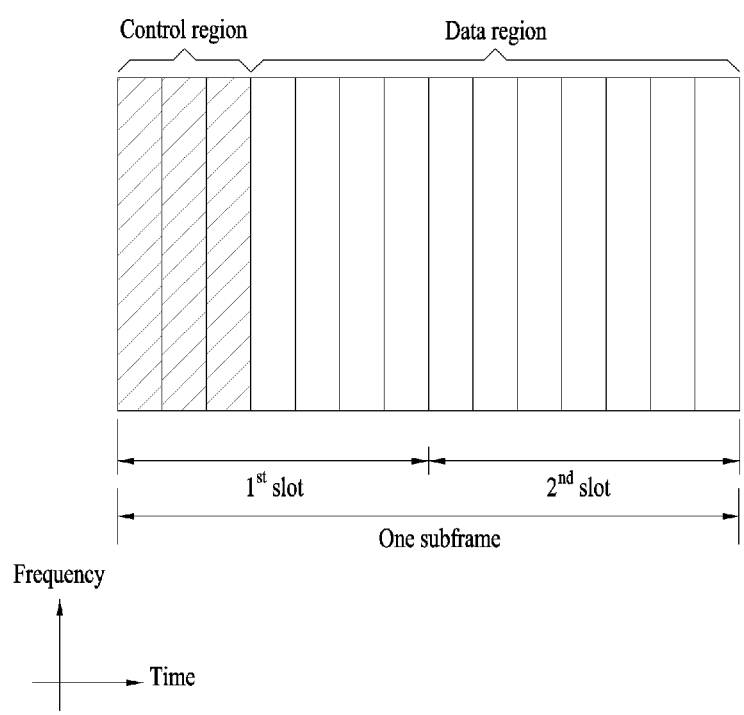
FIG. 7 is a diagram illustrating a structure of an uplink subframe of the LTE system.

FIG. 7 is a diagram illustrating a structure of a downlink subframe applicable to embodiments of the present invention.

Referring to FIG. 7, a maximum of three OFDM symbols from OFDM symbol index #0 of a first slot in a subframe correspond to a control region to be assigned with a control channel. The remaining OFDM symbols correspond to a data region to be assigned with a PDSCH. Examples of downlink control channels used in the 3GPP LTE system includes a physical control format indicator channel (PCFICH), a physical downlink control channel (PDCCH), a physical hybrid ARQ indicator channel (PHICH), etc.

The PCFICH is transmitted in a first OFDM symbol of a subframe and carries information on the number of OFDM symbols used for transmission of control channels (i.e. the size of the control region) in the subframe. The PHICH is a channel in response to UL transmission and carries ACK/NACK (acknowledgement/negative-acknowledgement) signal for HARQ (hybrid automatic repeat request). Control information transmitted through the PDCCH is called downlink control information (DCI). The DCI includes UL resource allocation information, DL resource allocation information, or UL transmit (TX) power control commands for a random UE group.

Carrier Aggregation

Figure 8:
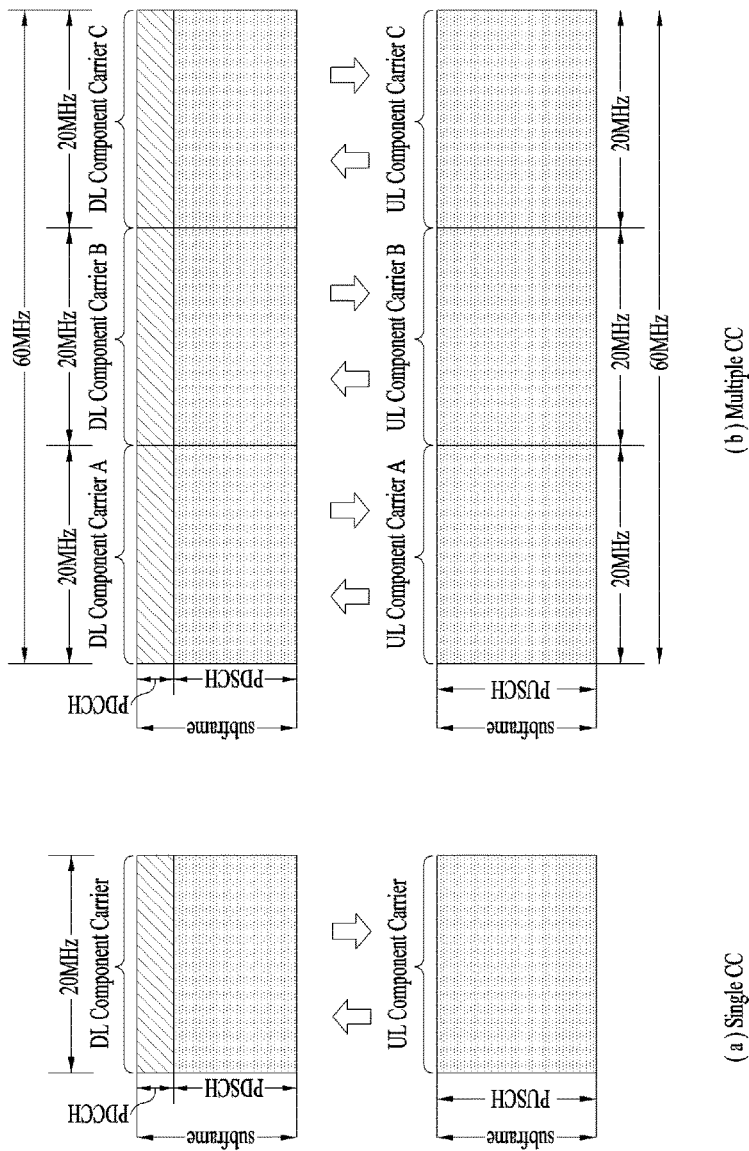
FIG. 8 is a diagram for explaining carrier aggregation.

FIG. 8 is a diagram for explaining carrier aggregation. Before description is given of carrier aggregation, the concept of a cell introduced to manage radio resources in LTE-A will be described first. A cell may be regarded as a combination of downlink resources and uplink resources. The uplink resource is not an essential element of the cell. The uplink resources are not essential elements and thus the cell may be composed of the downlink resources only or both of the downlink resources and uplink resources. However, this is the definition defined in the LTE-A release 10 and the cell may be composed of the uplink resources only. The DL resource may be called a downlink component carrier (DL CC) and the UL resource may be called an uplink component carrier (UL CC). The UL CC and the DL CC can be represented by a carrier frequency. The carrier frequency means a center frequency of a corresponding cell.

Cells may be divided into a primary cell (PCell), which operates at a primary frequency, and a secondary cell (SCell), which operates at a secondary frequency. The PCell and the SCell may be collectively referred to as a serving cell. The PCell may be designated during an initial connection establishment, connection re-establishment or handover procedure of a UE. In other words, the PCell may be understood as a cell that serves as a control-related center in a carrier aggregation environment, which will be described in detail later. A UE may be assigned a PUCCH in the PCell thereof and may then transmit the assigned PUCCH. The SCell may be configured after establishment of radio resource control (RRC) connection and it may be used for providing additional radio resources. In the carrier aggregation environment, all serving cells except the PCell may be considered as SCells. In case that a UE in an RRC_CONNECTED state fails to establish the carrier aggregation or does not support the carrier aggregation, only a single serving cell consisting of PCells exists. On the other hand, in the case in which a UE is in the RRC_CONNECTED state and the carrier aggregation is established, one or more serving cells exist. Moreover, in this case, PCells and all SCells are included in the serving cells. After starting an initial security activation procedure, a network may configure one or more SCells in addition to the PCell configured at the beginning of the connection establishment procedure for a UE supporting the carrier aggregation.

Hereinafter, the carrier aggregation is described with reference to FIG. 8. The carrier aggregation is a technology introduced to allow the use of a broader band to meet the demands for a high-speed transmission rate. The carrier aggregation may be defined as aggregation of two or more component carriers (CCs) having different carrier frequencies or aggregation of two or more cells. Referring to FIG. 8, FIG. 8(a) shows a subframe in the legacy LTE system in which one CC is used and FIG. 8(b) shows a subframe to which the carrier aggregation is applied. Particularly, FIG. 8(b) illustrates an example in which a bandwidth of total 60 MHz is supported in a manner of using three CCs of 20 MHz. In this case, the three CCs may be contiguous or non-contiguous.

A UE may simultaneously receive and monitor downlink data through a plurality of DL CCs. Linkage between a DL CC and a UL CC may be indicated by system information. The DL CC/UL CC link may be fixed in the system or may be semi-statically configured. Additionally, even if an entire system band is configured with N CCs, a frequency band that can be monitored/received by a specific UE may be limited to M(<N) CCs. Various parameters for the carrier aggregation may be set up cell-specifically, UE group-specifically, or UE-specifically.

Figure 9:
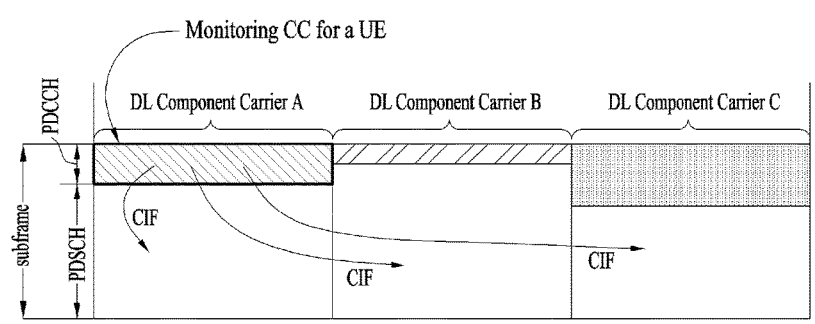
FIG. 9 is a diagram for explaining cross carrier scheduling.

FIG. 9 is a diagram for explaining cross carrier scheduling. For instance, the cross carrier scheduling means to include all DL scheduling allocation information of a DL CC in a control region of another DL CC selected from a plurality of serving cells. Alternatively, the cross carrier scheduling means to include all UL scheduling grant information on a plurality of UL CCs, which are linked to a DL CC selected among a plurality of serving cells, in a control region of the DL CC.

Hereinafter, a carrier indicator field (CIF) will be described.

As described above, the CIF may be included in a DCI format transmitted through a PDCCH (in this case, a size of the CIF may be defined as, for example, 3 bits) or may not be included in the DCI format (in this case, a size of the CIF may be defined as 0 bit). If the CIF is included in the DCI format, this indicates that the cross-carrier scheduling is applied. In case that the cross-carrier scheduling is not applied, downlink scheduling allocation information is valid for a DL CC through which the downlink scheduling allocation information is currently transmitted. In addition, an uplink scheduling grant is valid for a UL CC linked to the DL CC through which the downlink scheduling allocation information is transmitted.

In case that the cross-carrier scheduling is applied, the CIF indicates a CC related to the downlink scheduling allocation information which is transmitted over the PDCCH in a DL CC. For example, referring to FIG. 9, downlink allocation information on DL CC B and DL CC C, i.e., information on PDSCH resources, is transmitted through a PDCCH in a control region of DL CC A. After monitoring DL CC A, a UE may recognize that a resource region of PDSCH and the corresponding CC.

Whether or not the CIF is included in the PDCCH may be set semi-statically and the CIF may be enabled UE-specifically through higher layer signaling.

When the CIF is disabled, a PDCCH in a specific DL CC allocates a PDSCH resource in the same DL CC and may also allocate a PUSCH resource in a UL CC linked to the specific DL CC. In this case, a coding scheme, CCE-based resource mapping, a DCI format, and the like identical to those in the legacy PDCCH structure may be applied.

On the other hand, when the CIF is enabled, a PDCCH in a specific DL CC may allocate a PDSCH/PUSCH resource in a single DL/UL CC indicated by the CIF, among a plurality of the aggregated CCs. In this case, the CIF may be additionally defined in the legacy PDCCH DCI format. That is, the CIF may be defined as a field with a fixed length of 3 bits. Alternatively, a CIF position may be fixed regardless of a size of the DCI format. The coding scheme, CCE-based resource mapping, DCI format, and the like of the legacy PDCCH structure may also be applied to this case.

When the CIF exists, an eNB may allocate a DL CC set in which the PDCCH is to be monitored. Accordingly, the burden of blind decoding to a UE may be lessened. The PDCCH monitoring CC set corresponds to a portion of all aggregated DL CCs and the UE may perform PDCCH detection/decoding only in the corresponding CC set. In other words, to perform PDSCH/PUSCH scheduling for a UE, the eNB may transmit the PDCCH only in the PDCCH monitoring CC set. The PDCCH monitoring DL CC set may be configured UE-specifically, UE group-specifically or cell-specifically. For example, when 3 DL CCs are aggregated as shown in the example of FIG. 9, DL CC A may be set as a PDCCH monitoring DL CC. If the CIF is disabled, the PDCCH in each DL CC may schedule only the PDSCH within the DL CC A. On the other hand, if the CIF is enabled, the PDCCH in DL CC A may schedule not only the PDCCH of the DL CC A but also the PDSCH of the other DL CCs. In the case that the DL CC A is set as the PDCCH monitoring CC, the PDCCH may not be transmitted in DL CC B and DL CC C.

Transmission Timing Adjustments

In the LTE system, the amount of time that a signal transmitted from a UE takes to reach an eNB may vary depending on a radius of a cell, a location of the UE in a cell, mobility of the UE, and the like. That is, unless the eNB controls a UL transmission timing of each UE, interference may occur between UEs while each UE communicates with the eNB. Moreover, this may increase an error occurrence rate of the eNB. The amount of time that the signal transmitted from the UE takes to reach the eNB may be referred to as a timing advance. Assuming that a UE is randomly located randomly in a cell, the timing advance from the UE to the eNB may vary depending on a location of the UE. For instance, if the UE is located at the boundary of the cell instead of at the center of the cell, the timing advance of the UE may be increased. In addition, the timing advance may vary depending on a frequency band of the cell. Thus, the eNB needs to be able to manage or adjust transmission timings of UEs in the cell to prevent the interference between UEs. The management or adjustment of transmission timings, which is performed by the eNB, may be referred to as timing advance maintenance or time alignment.

The timing advance maintenance or time alignment may be performed in a random access procedure. During the random access procedure, an eNB may receive a random access preamble from a UE and then calculate a timing advance value using the received random access preamble. The UE may receive the calculated timing advance value through a random access response and then update a signal transmission timing based on the received timing advance value. Alternatively, after receiving an uplink reference signal (e.g., SRS (sounding reference signal) that is transmitted periodically or aperiodically from the UE, the eNB may calculate the timing advance. Thereafter, the UE may update the signal transmission timing based on the calculated timing advance value.

As described above, the eNB may measure UE's timing advance through the random access preamble or the uplink reference signal and then inform the UE of an adjustment value for the time alignment. Here, the adjustment value for time alignment may be referred to as a timing advance command (TAC). The TAC may be processed by a MAC layer. If a UE receives the TAC from the eNB, the UE assumes that the received TAC is valid only for a prescribed time. A time alignment timer (TAT) may be used for indicating the prescribed time. A TAT value may be transmitted to the UE through higher layer signaling (e.g., RRC signaling).

A UE may start transmission of uplink radio frame #i $(N_{TA}+N_{TAoffset}) \times T_s$ seconds before the start of a corresponding downlink radio frame, where $0 \leq N_{TA} \leq 20512$, $N_{TAoffset}=0$ in case of a FDD frame structure, and $N_{TAoffset}=624$ in case of a TDD frame structure. $N_{TA}$ may be indicated by the TAC and $T_s$ represents a sampling time. The UL transmission timing may be adjusted in unit of a multiple of $16T_s$. The TAC may be given as 11 bits in the random access response and it may indicate a value of 0 to 1282. In addition, $N_{TA}$ may be given TA*16. Alternatively, the TAC may be given as 6 bits and it may indicate a value of 0 to 63. In this case, $N_{TA}$ is given as $N_{TA,old}+(TA-31)*16$. The TAC received in subframe n may be applied starting from subframe n+6.

TAG (Timing Advance Group)

In case that a UE uses a plurality of serving cells, there may be serving cells having similar timing advance characteristics. For example, serving cells having similar frequency characteristics (e.g. frequency bands) or similar propagation delays may have similar timing, advance characteristics. Thus, when carrier aggregation is performed, serving cells having similar timing advance characteristics may be managed as a group to optimize signaling overhead caused by synchronization adjustment of a plurality of uplink timings, such a group may be referred to as a timing advance group (TAG). Serving cell(s) having similar timing advance characteristics may belong to one TAG and at least one serving cell(s) in the TAG must have uplink resources. For each serving cell, an eNB may inform a UE of TAG allocation using a TAG identifier through higher layer signaling (e.g. RRC signaling), Two or more TAGs may be configured for one UE. If a TAG identifier indicates 0, this may mean a TAG including a PCell. For convenience, the TAG including the PCell may be referred to as a primary TAG (pTAG) and TAG(s) other than the pTAG may be referred to as a secondary TAG (sTAG or seeTAG). A secondary TAG identifier (sTAG ID) may be used to indicate an sTAG corresponding to an SCell. If an sTAG ID is not configured for an SCell, the SCell may be configured as a part of pTAG. One TA may be commonly applied to all CCs included in one TA group.

Hereinafter, a description will be given of a structure of TAC MAC CE for transmitting the TAC to a UE.

TAC MAC CE (Timing Advance Command MAC CE)

In the 3GPP LTE system, MAC (medium access control) PDU (protocol data unit) includes a MAC header, a MAC control element (CE), and at least one MAC service data unit (SDU). The MAC header includes at least one sub-header. Each sub-header corresponds to the MAC CE and MAC SDU. The sub-header is used to represent lengths and properties of the MAC CE and MAC SDU.

The MAC SDU is a data block provided from a higher layer (e.g., an RLC layer or an RRC layer) of a MAC layer. The MAC CE is used to deliver control information of the MAC layer such as a buffer status report.

The MAC sub-header includes the following fields
R (1 bit): A reserved field.
E (1 bit): An extended field. It indicates whether there are F and L fields in a next field.
LCID (5 bit): A logical channel ID field. It indicates a type of the MAC CE or a specific logical channel to which the MAC SDU belongs.
F (1 bit): A format field. It indicates whether a next L field has a size of 7 bits or 15 bits.
L (7 or 15 bit): A length field. It indicates a length of the MAC CE or MAC SDU corresponding to the MAC sub-header.

The F and L fields are not included in a MAC sub-header corresponding to a fixed-sized MAC CE.

Figure 10:
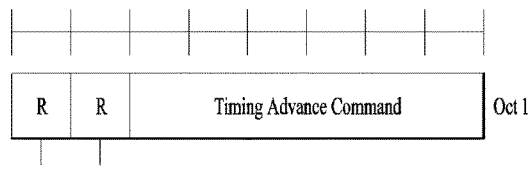
FIG. 10 illustrates a structure of TAC MAC CE.

FIG. 6 illustrates TAC MAC CE corresponding to a fixed-sized MAC CE. TAC is used for controlling the amount of time adjustment to be applied to a UE and it is identified by the LCID of the MAC PDU sub-header. Here, the MAC CE has a fixed size and it is configured with a single octet as shown in FIG. 10.

R (1 bit): A reserved field.
TAC (timing advance command) (6 bits): It indicates a $T_A$ index value (e.g., 0, 1, 2, ..., 63) used for controlling the amount of time adjustment to be applied to a UE.

Although the adjustment value for the time alignment may be transmitted through the TAC, it may be transmitted through a random access response (hereinafter abbreviated as RAR) in response to a random access preamble transmitted from a UE for initial access. Hereinafter, a description will be given of a method of performing a random access procedure proposed for TAC reception.

Random Access Procedure

In the LTE system, a UE can perform a random access procedure in the following cases:
The UE performs initial access without RRC connection with an eNB.
The UE initially accesses a target cell during a handover procedure.
The random access procedure is requested by a command of an eNB.
Data to be transmitted in UL is generated when UL time synchronization is not matched or a dedicated radio resource used for requesting radio resources is not allocated.
A recovery procedure is performed due to radio link failure or handover failure.

Based on the aforementioned description, a general contention-based random access procedure will be described below.

(1) Transmission of First Message

First, the UE may randomly select one random access preamble from a set of random access preambles indicated by system information or a handover command. Thereafter, the UE may transmit the random access preamble by selecting physical RACH (PRACH) resources capable of carrying the random access preamble.

(2) Reception of Second Message

After transmitting the random access preamble, the UE attempts to receive a random access response for the UE within a random access response reception window indicated by the system information or the handover command from the eNB [S902]. In detail, the random access response information may be transmitted in the form of a MAC PDU. The MAC PDU may be transmitted through a physical downlink shared channel (PDSCH). In addition, to appropriately receive information transmitted through the PDSCH, the UE needs to monitor a physical downlink control channel (PDCCH). That is, the PDCCH may contain information of a UE that needs to receive the PDSCH, frequency and time information of radio resources of the PDSCH, a transmission format of the PDSCH, etc. Once the UE successfully receives the PDCCH transmitted to the UE, the UE may appropriately receive the random access response transmitted through the PDSCH based on the information contained in the PDCCH. Moreover, the random access response may include a random access preamble identifier (RAPID), a UL grant indicating a UL radio resource, a temporary C-RNTI, and a timing advance command (TAC).

As described above, the random access response requires the random access preamble ID. This is because, since the random access response may include random access response information for one or more UEs, a UE capable of using the UL grant, the temporary C-RNTI, and the TAC should be indicated. Here, it is assumed that a random access preamble selected by a UE matches a random access preamble ID for the UE. Thus, the UE may receive the UL grant, the temporary C-RNTI, the TAC, etc.

(3) Transmission of Third Message

In case that the UE receives the valid random access response, the UE processes information contained in the random access response. That is, the UE applies the TAC and stores the temporary C-RNTI. In addition, the UE may store data to be transmitted in response to reception of the valid random access response in a message 3 buffer.

The UE transmits the data (i.e., the third message) to the eNB using the received UL grant. The third message needs to contain an ID of the UE. In the contention-based random access procedure, the eNB cannot determine which UE perform the random access procedure and thus the ID of the UE performing the random access procedure need to be included for later contention resolution.

To include the ID of the UE, two methods are discussed. As a first method, if the UE already has a valid cell ID assigned by a corresponding cell prior to the random access procedure, the UE transmits its C-RNTI through a UL transmission signal corresponding to the UL grant. On the other hand, if the UE is not assigned the valid ID prior to the random access procedure, the UE contains its unique ID (e.g., S-TMSI or random ID) in data and transmits the data. In general, the unique ID is longer than the C-RNTI. In case that the UE transmits data corresponding to the UL grant, the UE initiates a contention resolution timer (hereinafter referred to as a CR timer).

(4) Reception of Fourth Message

After transmitting the data including its ID through the UL grant contained in the random access response, the UE stands by an instruction of the eNB for the contention resolution. That is, in order to receive a specific message, the UE attempts to receive the PDCCH [S904]. For the PDCCH reception, two methods are discussed. As described above, when the ID of the UE in the third message, which is transmitted in response to the UL grant, is transmitted using the C-RNTI, the UE attempts to receive the PDCCH using the C-RNTI. When the ID is the unique ID, the UE may attempt to receive the PDCCH using the temporary C-RNTI contained in the random access response. In the former case, if the UE receives the PDCCH through its C-RNTI before the CR timer expires, the UE determines that the random access procedure is normally performed and then completes the random access procedure. In the latter case, if the UE receives the PDCCH through the temporary C-RNTI before the CR timer expires, the UE checks data transmitted through the PDSCH indicated by the PDCCH. If its unique ID is contained in the data, the UE determines that the random access procedure is normally performed and then completes the random access procedure.

Unlike the contention-based random access procedure illustrated in FIG. 7, a non-contention-based random access procedure is completed after transmission of the first message and the second message only. However, before the UE transmits the random access preamble as the first message to the eNB, the UE is assigned the random access preamble from the eNB. Thereafter, the UE transmits the assigned random access preamble as the first message to the eNB and then receives the random access response from the eNB. Thereafter, the random access procedure is completed.

According to the present invention, the eNB can trigger the PRACH using a PDCCH command through the PDCCH to secure synchronization. Subsequently, the UE transmits a PRACH preamble to the eNB. The transmission of the PRACH preamble, which is initially transmitted by the UE to match synchronization, corresponds to contention-based PRACH preamble transmission. The eNB transmits a random access response message to the UE in response to the received first message. In this case, the random access response message includes contents shown in Table 3 as well as the TAC. Table 7 below shows information included in a random access response grant (RA response grant) of 3GPP LTE TS 36.213.

TABLE 3

| Content | The number of bits |
|---|---|
| Hopping flag | 1 |
| Fixed size resource block assignment | 10 |
| Truncated modulation and coding scheme | 4 |
| TPC command for scheduled PUSCH | 3 |
| UL delay | 1 |
| CSI request | 1 |

A Case of Having a Plurality of TAs

Figure 11:
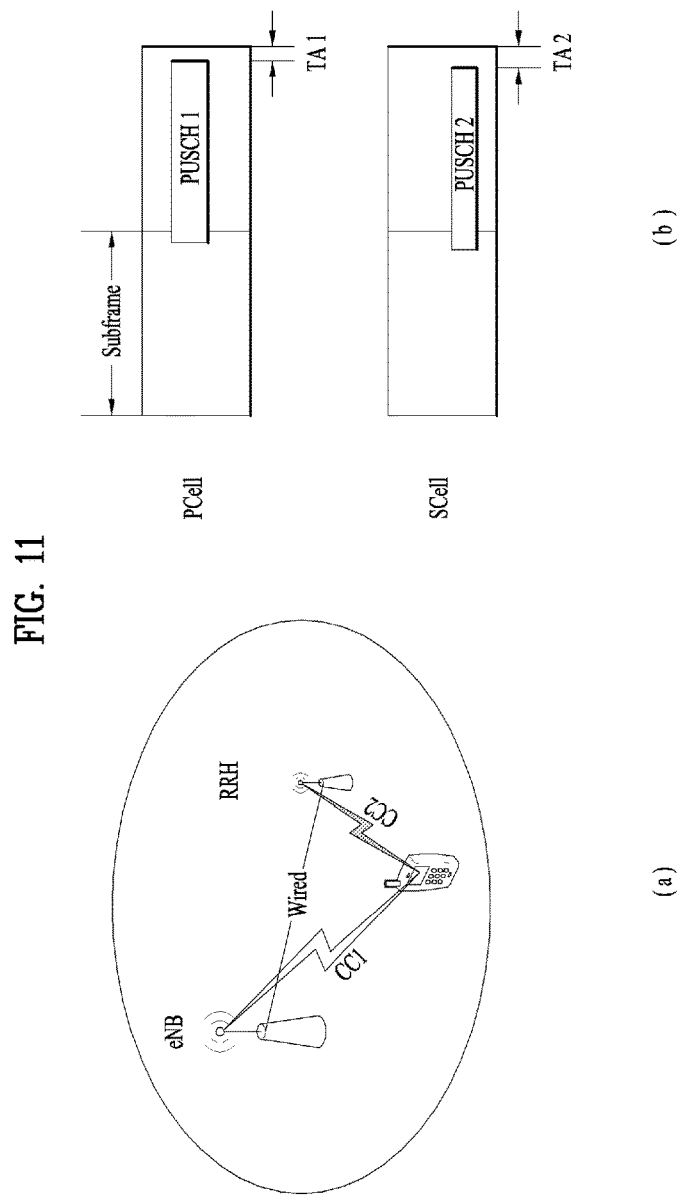
FIG. 11 illustrates an example of aggregating a plurality of cells with different frequency characteristics.

FIG. 11 illustrates an example of aggregating a plurality of cells with different frequency characteristics. The LTE-A system allows a UE to aggregate a plurality of cells belonging to different frequency bands (i.e., separated far from each other in the frequency domain), a plurality of cells with different propagation characteristics, or a plurality of cells having different coverage. Moreover, in case of a specific cell, it may be considered that RRH (remote radio header) devices such as a repeater are deployed within the cell for the purpose of coverage expansion or coverage hole elimination. For instance, inter-site carrier aggregation may be performed between cells formed in different locations. Here, the RRH can be referred to as a remote radio unit (RRU). The eNB and RRH (or RRU) can be referred to as a node or a transmitting node.

For instance, referring to FIG. 11(a), a UE aggregates two cells (i.e., cell 1 and cell 2). The cell 1 (or cc 1) may be formed to perform direct communication with an eNB without the RRH and the cell 2 may be formed to use the RRH due to limited coverage. In this case, a propagation delay (or eNB's reception timing) of a UL signal transmitted from a UE through the cell 2 (or CC 2) may be different from a propagation delay (or eNB's reception timing) of a UL signal transmitted through the cell 1 due to a location of the UE, frequency characteristics, etc. When a plurality of cells have different propagation delay characteristics as described above, multiple timing advances (TAs) are inevitable.

FIG. 11(b) illustrates a plurality of cells with different TAs. Referring to FIG. 11(b), a UE aggregates two cells (e.g., PCell and SCell). The UE may transmit a UL signal (PUSCH) by applying different TA to each of the two cells.

In case that the UE receives a plurality of TAs, if a UL signal transmission timing of a specific cell (e.g., PCell) is significantly different from that of a different cell, a method of restricting uplink signal transmission in a corresponding cell may be considered. For instance, if a gap between the transmission timings is higher than a specific threshold value, the method of the restricting uplink signal transmission in the corresponding CC may be considered. The specific threshold value may be configured as a higher signal or it may be informed to the UE in advance. For instance, if UL signals transmitted from the UE have significantly different transmission timings, it may cause an irregular UL/DL signal transmission timing relationship between the UE and the eNB. That is, the method is required to prevent malfunction caused by the irregular UL/DL signal transmission timing relationship between the UE and the eNB.

Moreover, if a difference between timings for transmitting PUSCH/PUCCH and the like, which are transmitted to different cells in the same subframe by a single UE, it may increase complexity of UL signal configuration and response time adjustment between DL and UL.

Accordingly, when uplink transmission timings between a plurality of cells are significantly different from each other due to an independent TA operation, a scheme for dropping transmission of uplink signals (e.g., PUSCH, PUCCH, SRS, RACH, etc.) of a UE or a scheme for limiting a transmission timing may be considered. Particularly, the present invention proposes the following schemes.

Scheme 1)

If a TA difference between a plurality of cells in which a UE needs to perform UL transmission is equal to or higher than a threshold, the UE always drops uplink transmission to a random cell to maintain a TA difference between actually transmitted uplink signals below the threshold at all times. In this case, the UE may drop uplink signal transmission to a cell, of which a TA difference exceeds the threshold with reference to a specific cell. More particularly, the specific cell may be a PCell or belong to a PCell group. Alternatively, the specific cell may be configured by a network through RRC signaling, etc. Here, an operation of dropping the uplink signal transmission may include an operation of not transmitting a signal of which transmission is previously configured, an operation of not expecting or discarding a command of scheduling PUSCH for a corresponding cell when the TA difference exceeds the threshold.

Scheme 2)

If a TA difference between a plurality of cells in which a UE needs to perform UL transmission is equal to or higher than a threshold, the UE adjusts an uplink transmission timing for a random cell to maintain a TA difference between the transmission timing for the random cell and a transmission timing for another cell below the threshold. In this case, the UE may adjust a transmission timing of an uplink signal for a cell, of which a TA difference exceeds the threshold with reference to a specific cell. Here, the specific cell may be a PCell or belong to a PCell group. Alternatively, the specific cell may be configured by a network through RRC signaling, etc.

Scheme 3)

If a UE receives a TAC (timing advance command) with a TA difference between a plurality of cells, in which the UE needs to perform UL transmission, equal to or higher than a threshold, the UE discards the corresponding TAC or limitedly applies the TAC only when the TA difference is lower than the threshold. In this case, the UE may apply the scheme 3 only when receiving TAC of which a TA difference exceeds the threshold with reference to a specific cell. Here, the specific cell may be a PCell or belong to a PCell group. Alternatively, the specific cell may be configured by a network through higher layer signaling (e.g., RRC signaling), etc.

In the above schemes, the TA threshold value may be configured by the network through higher layer signaling (e.g., RRC signaling), etc. In addition, the cell may include a cell group, and more specifically, a cell group to which the same TAC is applied. Moreover, the TA difference may include a difference between TA values managed by a UE, a difference between TA values that a UE needs to apply to transmission of a specific subframe, a difference between values of TACs received by a UE, or a difference between transmission timings which a UE needs to apply to transmission. Furthermore, when PRACH, i.e., a signal corresponding to exception of TA application controlled by a TAC value is transmitted, the TA difference limitation scheme may not be applied.

Meanwhile, mismatch between transmission timings of individual carriers may occur in D2D (device-to-device) communication. Regarding the mismatch, operations of an UE or an eNB have not been defined. Thus, the present invention propose a method of transmitting and receiving signals when a transmission timing of a WAN signal mismatches with that of a D2D signal or transmission timings of D2D signals mismatch with each other.

D2D (Device-to-Device) Communication

When D2D communication is introduced to the aforementioned wireless communication system (e.g., 3GPP LTE system or 3GPP LTE-A system), a scheme for performing the D2D communication will be described in detail.

Hereinafter, a device-to-device communication environment applicable to the present invention will briefly be described.

The D2D communication refers to communication between an electronic device and another electronic device. In a broad sense, the D2D communication refers to wire or wireless communication between electronic devices or communication between a machine and a device controlled by a user. Recently, the D2D communication may generally mean wireless communication between electronic devices operating without human involvement.

Figure 12:
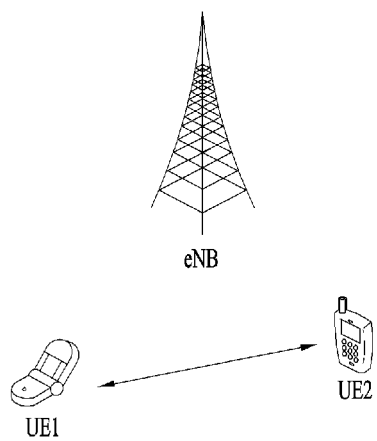
FIG. 12 illustrates a communication system applicable to the present invention.

FIG. 12 is a conceptual diagram for explaining D2D communication. In FIG. 12, a device-to-device or UE-to-UE communication scheme is illustrated as an example of the D2D communication. According to this scheme, data can be exchanged between UEs without intervention of an eNB. A direct link established between devices can be referred to as a D2D link. Compared to the conventional eNB-based communication, the D2D communication has advantages in that latency is reduced and the amount of required resources is small. Here, the UE means a terminal of a user. However, if a network equipment such as an eNB transmits and receives signals according to the communication scheme between UEs, the network equipment can also be considered as the UE.

Although the D2D communication corresponds to a scheme for supporting the device-to-device (or UE-to-UE) communication without intervention of the eNB, the D2D communication should not cause interference or disturbance to the conventional wireless communication system (e.g., 3GPP LTE/LTE-A) since it is performed in a manner of reusing resources in the conventional wireless communication system. In this context, it is also important to minimize interference caused to the D2D communication by a UE or an eNB operating in the conventional wireless communication system.

Meanwhile, even a UE that performs a D2D operation should be able to perform communication with the eNB (hereinafter, communication with the eNB may be referred to as WAN) to maintain communication with a UE located out of an area where direct communication is possible. This may mean that while transmitting a D2D signal using a specific resource, the UE should be able to transmit a WAN signal using a different resource. If a specific UE is placed in a UL carrier aggregation situation in which a plurality of serving cells for uplink carriers are configured, the specific UE may perform an operation of transmitting a WAN signal through one carrier (hereinafter referred to as CC1) and transmitting a D2D signal through a different carrier (hereinafter referred to as CC2) at a specific timing for reception and transmission of the D2D signal and WAN signal. Generally, a UE applies a timing advance (TA) to WAN transmission. The reason for this is that if a distance between individual UE and the eNB is adjusted, signals transmitted from UEs located at different positions may be reached to the eNB at the same time. The eNB may adjust a timing value, $N_{TA}$, which is applied by a UE, in a manner of transmitting a TAC. And, the UE determines a final TA by adding a predetermined offset value, $N_{TA,offset}$ to the timing value, $N_{TA}$. The UE determines a timing before the determined TA from a boundary of a DL subframe received from the eNB as a boundary of its UL subframe and then initiates signal transmission.

On the other hand, in case of some D2D signals, signal transmission may be initiated at a timing different from the determined UL subframe boundary. Examples of the above D2D signals may include a D2D discovery signal and a D2D communication signal that are transmitted without a separate indication from the eNB. Such D2D signals may enable RRC_IDLE UEs, which fails to receive valid TACs due to no access to the eNB, to participate in signal transmission. For instance, some D2D signals may be transmitted by considering a timing before $N_{TA,offset}$ from the boundary of the DL subframe received by the UE from the eNB as a transmission initiation timing of the D2D signals. For commonality with the RRC_IDLE UE, an RRC_CONNECTED UE that receives a valid TAC may be configured to perform the same operation. In this case, whether the TA is applied to a D2D signal may be determined according to properties of the D2D signal.

1) When a D2D signal is transmitted based on UE-specific resource allocation from the eNB, the TA may be applied.

2) When a UE transmits a D2D signal by selecting one resource from a resource pool allocated by the eNB for a plurality of unspecified UEs, the TA may not be applied.

3) The TA may not be applied to a signal for synchronization between UEs participating in D2D transmission and reception.

4) The TA may not be applied to a D2D control signal for carrying various types of control information on the following D2D transmission signals.

As described above, in the case of D2D signals, mismatch between transmission timings of individual carriers may occur in the case of D2D signals. Regarding the mismatch, operations of an UE or an eNB have not been defined. When the D2D signals overlap with different signals, there may be a case in which signal transmission and reception is not smoothly performed due to problems such as interference and the like. The present invention propose a method of transmitting and receiving signals when a transmission timing of a WAN signal mismatches that of a D2D signal, or when transmission timings of D2D signals mismatch with each other, or when a D2D signal is transmitted together with another signal. First of all, a case in which the transmission timing of the WAN signal mismatches that of the D2D signal will be described with reference to FIGS. 13 and 14.

A Case in which Transmission Timings of WAN and D2D Mismatch with Each Other

Figure 13:
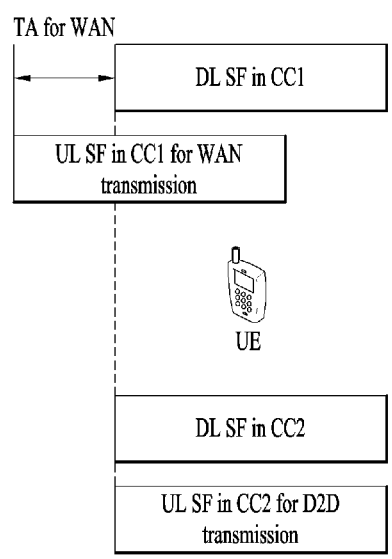
FIG. 13 is a diagram illustrating an example in which a D2D signal and a WAN signal (transmission) are transmitted through different cells according to an embodiment of the present invention.
Figure 14:
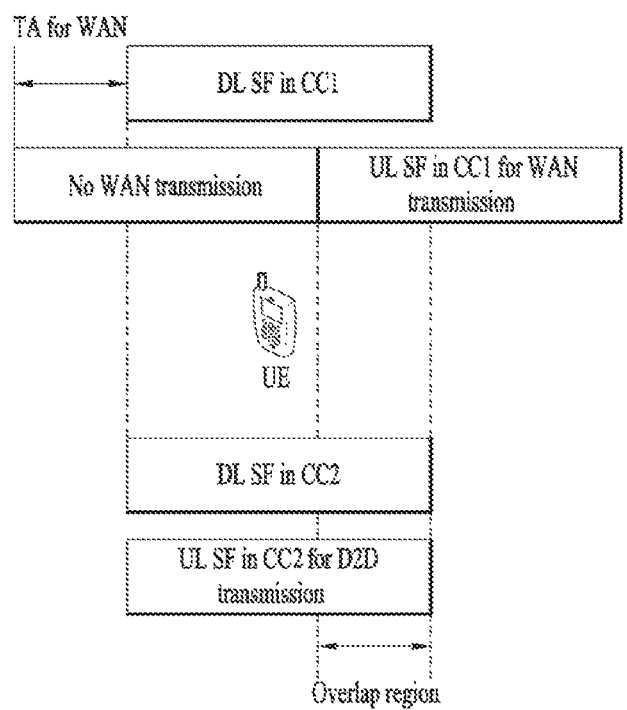
FIG. 14 is a diagram illustrating an example in which a D2D signal and a WAN signal (transmission) are transmitted through different cells according to another embodiment of the present invention.

FIGS. 13 and 14 illustrates examples in which a D2D signal is transmitted at a timing different from a UL subframe boundary for a WAN signal as described above. In the examples, a UE that receives valid TAC transmits a WAN signal in CC1 by applying the TAC and a D2D signal in CC2 without applying the TAC. It is assumed that downlink subframe boundaries received by the UE in CC1 and CC2 are equal to each other and $N_{TA,offset}$ is set to 0. Thus, transmission timing mismatch between CC1 for WAN transmission and CC2 for D2D transmission may occur as shown in FIGS. 13 and 14.

In the following description, a method of transmitting and receiving signals when the WAN transmission timing mismatches the D2D transmission timing as shown in FIGS. 13 and 14 is proposed. The proposed method may be modified according to whether a UE has a capability of supporting a plurality of TAs. Whether the UE has the capability of supporting the plurality of the TAs may be informed when the UE performs a procedure for initially accessing a network.

Hereinafter, UEs are divided into two types: a UE without a capability of supporting a plurality of TAs and a UE with a capability of supporting a plurality of TAs. A method of method of transmitting and receiving signals is described for each type. First, a case in which a UE does not have a capability of supporting a plurality of TAs will be described.

A Case in which a UE does not have a Capability of Supporting a Plurality of TAs In case that a UE does not have a capability of supporting a plurality of TAs, even though the UE has a capability of simultaneously transmitting signals through two uplink carriers, a restriction in which TA values applied to the two carrier are the same is imposed. To simultaneously transmit WAN and D2D signals in the case (i.e., in the case of different transmission timings) as shown in FIG. 13, implementation of a transmitting circuit of the UE should be changed significantly. This may be almost the same as implementation of a UE capable of applying different TAs to two carriers.

Therefore, as an embodiment of the present invention, it is proposed that when WAN and D2D signals having different transmission timings are scheduled to be transmitted through different carriers at the same timing, only one of the WAN and D2D signals is transmitted. In other words, when the WAN and D2D signals having the different transmission timings are scheduled to be transmitted through different carriers at the same timing, the UE in the corresponding condition (i.e., without the capability of supporting a plurality of TAs) selects and transmits one of the WAN and D2D signals in order to maintain the same implementation complexity as that in the related art.

In order to select one signal from the WAN and D2D signals, the UE may operates as follows. Compared to the D2D signal, the WAN signal should be transmitted rapidly since WAN resources includes various types of information between a UE and an eNB and the WAN resources need to be delivered to a final destination through a backhaul link by passing through the eNB. Thus, it is preferred to select transmission of the WAN signal when there are the WAN signal and the D2D signal. In other words, in the case as shown in FIG. 13 and/or FIG. 14, the corresponding UE needs to stop transmission of the D2D signal in CC2 and then transmit only the WAN signal in CC1.

To stop the transmission of the D2D signal, the UE may be configured to operate according to the following embodiments.

(1) Method 1

The UE may stop the D2D signal transmission in the entirety of the corresponding subframe. In the embodiment of FIG. 13, even if there is no WAN transmission in CC1 in a next subframe, the D2D signal transmission in CC2 may be stopped in the entirety of the corresponding subframe. However, in case of a signal (e.g., a D2D synchronization signal transmitted for synchronization by using only four symbols of one subframe) transmitted using only partial symbols in one subframe, transmission can be maintained exceptionally unless direct overlapping occurs.

(2) Method 2

The UE may stop the D2D signal transmission only in a problematic time region instead of stopping the D2D signal transmission in the entirety of the corresponding subframe. Referring to FIG. 13, if there is no WAN transmission in CC1 in a subframe next to the subframe in which the WAN transmission is performed, the D2D signal transmission in CC2 is stopped only in an interval overlapping with the WAN transmission but the D2D signal transmission is maintained in the remaining interval. In this case, the overlapping interval may include a time region where the UE transitions to a state of stopping WAN signal transmission after transmitting a WAN signal and/or a time region where the UE transition to a state of transmitting a WAN signal while transmitting no signal.

(3) Method 3

Among the above-mentioned methods of stopping D2D signal transmission, an appropriate one can be selected and applied according to the situation. The method 3 is described with reference to FIGS. 13 and 14. FIG. 13 illustrates a case in which the front part of a D2D signal overlaps with WAN transmission and FIG. 14 illustrates a case in which the tail part of a D2D signal overlaps with WAN transmission.

Referring to FIG. 13, when the front part of the D2D signal overlaps with the WAN transmission, the D2D transmission may be stopped in the entirety of a subframe. If the front part overlaps, overlapping is likely to occur in most of the symbols since the TA generally has a small value. Moreover, an important signal such as a reference signal for demodulation is likely to be contained in the front part of the D2D signal.

On the other hand, referring to FIG. 14, when the tail part of the D2D signal overlaps with the WAN transmission, the D2D signal transmission may be stopped only in the overlapping interval. Particularly, this scheme is advantageous in that the D2D signal can be transmitted in most of the symbols without overlapping since the overlapping interval is not relatively long due to the low TA value.

In this case, a threshold (or a threshold value) for a length of the time interval overlapping with WAN is configured to define UE's operation more clearly. If the overlapping interval is higher than the threshold, the D2D transmission is stopped in the entirety of the corresponding subframe. On the contrary, if the overlapping interval is lower than the threshold, the D2D transmission is stopped only in the overlapping interval. Although not shown in FIG. 14, some symbols at the end of the D2D subframe can be vacant for the purpose of switching between transmission and reception of the D2D signal at all times. In this case, such empty symbols may be considered to be excluded from overlapping with WAN. As described above, when the UE does not have the capability of supporting a plurality of TAs, even though the UE has the capability of simultaneously transmitting signals through the two uplink carriers, the restriction in which TA values applied to the two carrier are the same is imposed. Moreover, even if the same TA value is used, transmission timing of signals may be different from each other. In this case, it may be difficult to transmit the signals simultaneously. For instance, there may be a case in which a signal to which the TA is not applied is included.

In this case, an eNB may perform scheduling without information on whether a UE can simultaneously transmit and receive signals and thus additional information may be required for efficient scheduling at the eNB. Therefore, it is proposed that the UE reports its own capability to the eNB. In this case, the capability report may contain an upper limit of a transmission timing difference between WAN and D2D signals, a difference between a WAN signal transmission timing and a D2D signal transmission timing, or information on whether the corresponding UE can simultaneously transmit and receive a plurality of signals (or whether the UE can have a capability of supporting the corresponding timing difference). Moreover, the capability report may include a field for indicating a band capable of simultaneous reception or transmission, a filed for indicating a D2D transmission and reception band, etc. Further, the UE may transmit the capability report to the eNB during the initial procedure for accessing the network.

For instance, in case of a D2D discovery signal, the TA cannot be applied at all times. In case of a D2D communication signal, the TA may not be applied due to mandatory SA transmission. Thus, the UE without the capability of supporting a plurality of TAs cannot transmit the WAN signal and D2D signal at the same time. When the UE cannot support a plurality of TAs for a combination of specific uplink transmission frequencies, the UE may report to the eNB that it cannot simultaneously transmit the WAN signal and D2D signal for the corresponding combination.

To transmit the report to the eNB, the UE may use separate signaling for explicit indication. Alternatively, the UE may utilize an existing signal for implicit indication. As an example of the explicit indication, the UE may inform the eNB of whether the UE can simultaneously transmit and receive the two signals as information with respect to the capability.

A Case in which a UE has a Capability of Supporting a Plurality of TAs

Hereinafter, signal transmission and reception operations of a UE with a capability of supporting a plurality of TAs will be described. Even though the UE has a capability of supporting a plurality of TAs, there may be a prescribed upper limit of a TA difference applicable to two carriers. For instance, an upper limit of a subframe boundary difference between the two carriers may be set to 32.47 us.

If a difference (i.e., a difference between TA values applied to transmission signals of two CCs when DL subframes of the two CCs are synchronized) between the WAN transmission initiation timing of CC1 and the D2D transmission initiation timing of CC2 in FIG. 13 is lower than the upper limit, the UE can simultaneously transmit two signals through the two carriers since transmission of the two signals is within an operating range of the corresponding UE.

On the contrary, when the difference between the WAN transmission initiation timing of CC1 and the D2D transmission initiation timing of CC2 is higher than the upper limit, it means that the transmission of the two signals is out of the capability of the corresponding UE. In this case, the UE may transmit only one of the two signals. In addition, the UE may discard the D2D transmission in CC2 and perform only the WAN signal transmission in CC1 as described above.

To reduce the frequency of occurrence of the above situations, the upper limit of the difference between the WAN signal transmission timing and the D2D signal transmission timing may be set higher than an upper limit of the difference between WAN signal transmission timings.

In this case, the UE may inform the eNB of information indicating whether the WAN signal and D2D signal can be simultaneously transmitted and received. In this case, the UE may directly inform the eNB of whether the two signals can be simultaneously transmitted by considering the upper limit value. Alternatively, the UE may inform the eNB of the upper limit of the difference between the WAN signal transmission timing and the D2D signal transmission timing during the initial access procedure. However, although the eNB receives the upper limit from the UE in advance, the eNB may have difficulty in completely understanding the D2D transmission timing of the UE. Thus, even when the UE informs the eNB of the upper limit, the UE may directly inform the eNB of whether the two signals can be transmitted and received at the same time.

Even in case that the D2D signal transmission is stopped due to the transmission timing difference between the WAN and D2D signals equal to or higher than the upper limit, which the UE can support, the UE may operate according to the aforementioned methods (i.e., methods 1, 2, and 3). Particularly, the D2D signal transmission may be stopped in the entirety of the D2D subframe or only in the interval overlapping with the WAN signal transmission. Similarly, in this case, whether the D2D signal transmission is stopped in the entire subframe or only in the partial symbols can be determined according to the length and location of the overlapping interval. For instance, if only the tail part of the D2D signal transmission overlaps with the WAN transmission in the next subframe as shown in FIG. 14 and if the length of the overlapping interval is equal to or lower than a prescribed level supported by the UE, the signal is transmitted in some symbols in the front part of the D2D subframe, whereas the D2D signal transmission can be stopped in the interval overlapping with the WAN. In this case, the UE may inform the eNB of whether to simultaneously transmit and receive the WAN signal and D2D signal. When the transmission timing difference between the WAN and D2D signals is equal to or higher than the upper limit, the UE may inform the eNB that the two signals cannot be transmitted simultaneously.

Meanwhile, a specific UE may have a capability of simultaneously transmitting signals through two CC which are not synchronized with each other. For instance, it is assumed that two eNBs receive UL signals in the respective CCs and the two eNBs are not synchronized with each other. In this case, the corresponding UE may simultaneously transmit WAN signals in two CCs to the two eNBs in the asynchronous state. Such a functionality can be referred to as dual connectivity. This case can be considered that the transmission timing difference between the two CCs, which can be supported by the corresponding UE, is not restricted. Similarly, if overlapping occurs due to unsynchronized D2D and WAN as shown in FIG. 13 or FIG. 14, simultaneous transmission can be performed. In this case, the UE may also inform the eNB of whether to simultaneously transmit and receive the WAN signal and D2D signal. That is, the UE may inform the eNB that the two signals can be transmitted simultaneously.

However, in this case, if the WAN signal consumes full power of the UE, the D2D signal transmission may be stopped. The reason for this is not to give priority in power allocation to the WAN signal but to assist management of WAN which shares resources with a plurality of UEs. Even in the case that D2D signal transmission is stopped due to the power consumed by the WAN signal, the UE may operate according to the aforementioned methods (i.e., methods 1, 2, and 3). Particularly, the UE may select and perform one of two operations of stopping D2D transmission in the entirety of a subframe and stopping D2D transmission only in an overlapping area. For instance, if the front part of the D2D signal overlaps in the subframe, the D2D signal transmission may be stopped in the entire subframe as mentioned in the foregoing description. In case that the tail part of the D2D signal overlaps in the subframe, the overlapping degree is compared with a reference value. When the overlapping degree is equal to or greater than the reference value, the D2D signal transmission is stopped in the entire subframe. On the contrary, when the overlapping degree is smaller than the reference value, the D2D signal transmission is stopped only in the overlapping area.

As described above, the eNB may fail to obtain accurate timing advance values used by individual UEs in some cases. Moreover, additional information may be required for efficient scheduling. Therefore, it is proposed that the UE reports its own capability to the eNB. In this case, the capability report may contain the upper limit of the transmission timing difference between the WAN and D2D signals, the difference between the WAN signal transmission timing and the D2D signal transmission timing, or information on whether the corresponding UE can simultaneously transmit and receive a plurality of signals (or whether the UE can have a capability of supporting the corresponding timing difference). Moreover, the capability report may include a field for indicating a band capable of simultaneous reception or transmission, a filed for indicating a D2D transmission and reception band, etc. Further, the UE may transmit the capability report to the eNB during the initial procedure for accessing the network.

For instance, if the case shown in FIG. 13 occurs and the difference between the transmission timings of the two signals is higher than the above-mentioned upper limit, the UE may inform the eNB of the fact that the transmission timing difference is higher than the upper limit or the fact that the UE cannot simultaneously transmit the two signals in order to assist an operation of the eNB. Alternatively, the UE may report the transmission timing difference between the two signals to the eNB. In this case, the UE may previously inform the eNB of the upper limit of the transmission timing difference between the WAN and D2D signals. Thus, after receiving the transmission timing difference between the two signals, the eNB may determine whether the UE can simultaneously transmit the two signals in a manner of comparing the transmission timing difference with the upper limit.

After receiving the above report, the eNB estimates whether the corresponding UE can simultaneously transmit the WAN and D2D signals. If determining that the corresponding UE cannot simultaneously transmit the WAN and D2D signals, the eNB may be configured not to schedule the WAN signal transmission at a timing at which the D2D signal transmission is expected in spite of the different carrier. On the contrary, the eNB may be configured not to schedule transmission and reception of the D2D signal.

To transmit the report to the eNB, the UE may use separate signaling for explicit indication. Alternatively, the UE may utilize an existing signal for implicit indication. As an example of the explicit indication, the UE may inform the eNB of whether the UE can simultaneously transmit and receive the two signals as information with respect to the capability. If the UE does not have a capability of performing both WAN signal transmission and reception and D2D transmission and reception with another UE through a plurality of carriers at the same time, the UE may transmit and receive signals according to the following priority order.

1) UL signal transmission from a UE to an eNB is preferentially selected and performed rather than D2D signal transmission and reception.

2) A D2D synchronization signal is preferentially selected and transmitted rather than other D2D signals. This is because if D2D synchronization signal transmission is dropped, it may significantly affect synchronization performance of another UE.

3) In case of a control signal (e.g., a signal including scheduling assignment for transmitting scheduling information on a D2D communication channel) for the following D2D transmission signals, since a plurality of D2D communication channels can be controlled by one-time transmission of the control signal, the control signal is preferentially selected and transmitted rather than such a D2D communication channel signal.

4) When two D2D signals do not include synchronization information or control information, a signal with a long transmission period is preferentially selected and transmitted.

Meanwhile, in terms of the WAN signal transmission, the two carriers may belong to the same timing advance group (TAG) to which the same TA is applied at all times. Similarly, in this case, the problem described with reference to FIG. 13 may also occur. Moreover, operations of a UE have not been defined. Accordingly, the UE can operate according to the following methods.

If CC1 and CC2 in the example of FIG. 13 belong to the same TAG, the UE may extend a WAN transmission operation such that the same TA is always applied in the case of the same TAG. In this case, if two signals with different transmission timings need to be transmitted at the same time, the UE may select one of the two signals. In other words, if CC1 and CC2 in FIG. 13 belong to the same TAG, only one signal (e.g., the WAN signal) can be selectively transmitted since the two signals cannot have different transmission timings in the case of the same TAG.

However, if transmission of the two signals having the different transmission timings is scheduled at a specific timing even though CC1 and CC2 in FIG. 13 belong to the same TAG and if the UE is able to support the above transmission, the UE may simultaneously transmit the two signals by adopting the different transmission timings in spite of the same TAG. For instance, in case that a transmitting timing difference between the two signals of FIG. 13 is lower than an upper limit value, even if the two carriers belong to the same TAG, the two signals are simultaneously transmitted at the different transmission timings.

Meanwhile, when D2D signals are transmitted through a plurality of carriers or even a single carrier, mismatch between timings may occur or a plurality of signals may overlap with each other.

Hereinafter, when D2D signals are simultaneously transmitted through two carrier, UE's operations will be described as an embodiment of the present invention.

Figure 15:
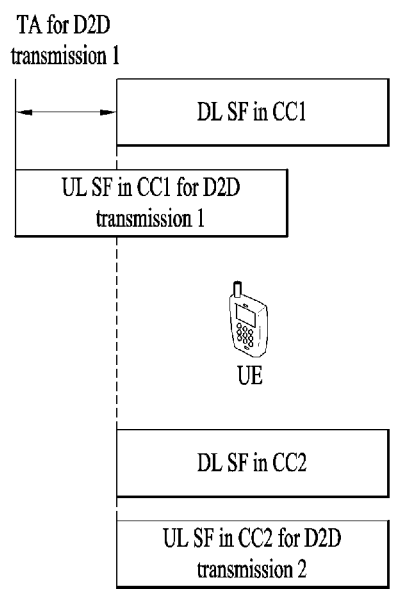
FIG. 15 is a diagram illustrating an example in which D2D signals are transmitted through a plurality of different cells according to a further embodiment of the present invention.

FIG. 15 illustrates an example of simultaneously transmitting D2D signals through two carriers. Referring to FIG. 15, a D2D signal to which the TA is applied may be transmitted in CC1 and a D2D signal to which the TA is not applied may be transmitted in CC2. In this case, whether the TA is applied to a D2D signal may be determined according to properties of the D2D signal.

1) When a D2D signal is transmitted based on UE-specific resource allocation from the eNB, the TA may be applied.

2) When a UE transmits a D2D signal by selecting one resource from a resource pool allocated by the eNB for a plurality of unspecified UEs, the TA may not be applied.

3) The TA may not be applied to a signal for synchronization between UEs participating in D2D transmission and reception.

4) The TA may not be applied to a D2D control signal for carrying various types of control information on the following D2D transmission signals.

Moreover, in case that the D2D signals are simultaneously transmitted in the two carriers as described above, if transmission timings of the D2D signals are different from each other, the operating principle of simultaneous transmission of WAN and D2D signals described with reference to FIGS. 13 and 14 can be applied. However, when only one of the two D2D signals is transmitted, reference for selection may be determined based on importance of a D2D signal. In general, the selection reference can be defined based on the following principles.

1) A D2D synchronization signal is preferentially selected and transmitted rather than other D2D signals. This is because if D2D synchronization signal transmission is dropped, it may significantly affect synchronization performance of another UE.

2) In case of a control signal (e.g., a signal including scheduling assignment for transmitting scheduling information on a D2D communication channel) for the following D2D transmission signals, since a plurality of D2D communication channels can be controlled by one-time transmission of the control signal, the control signal is preferentially selected and transmitted rather than such a D2D communication channel signal.

3) When two D2D signals do not include synchronization information or control information, a signal with a long transmission period is preferentially selected and transmitted.

Meanwhile, when a plurality of carriers are used or when only a single carrier is used, a D2D signal can be simultaneously performed with an uplink signal. Here, the simultaneous performance means that signals overlap with each other partially or entirely. For instance, even if scheduling for D2D transmission and reception is performed by an eNB, a corresponding subframe may be configured for the purpose of synchronization through uplink signaling. In this case, a UE should be able to determine a signal of which transmission and reception will be stopped.

When overlapping occurs between the uplink signal and the D2D signal or between D2D signals, one of them needs to be dropped. In this case, one of the aforementioned D2D signal transmission method can be selected and applied in an appropriate manner.

The present invention proposes that operations should be performed according to the following priority order.

1) Uplink signal transmission from a UE to an eNB is preferentially selected and performed rather than D2D signal transmission and reception.

2) A D2D synchronization signal is preferentially selected and transmitted rather than other D2D signals. This is because if D2D synchronization signal transmission is dropped, it may significantly affect synchronization performance of another UE.

3) In case of a control signal (e.g., a signal including scheduling assignment for transmitting scheduling information on a D2D communication channel) for the following D2D transmission signals, since a plurality of D2D communication channels can be controlled by one-time transmission of the control signal, the control signal is preferentially selected and transmitted rather than such a D2D communication channel signal.

4) When two D2D signals do not include synchronization information or control information, a signal with a long transmission period is preferentially selected and transmitted.

Particularly, in case that subframe n for transmitting a D2D signal is configured for usage of synchronization, transmission and reception of a D2D data (or communication channel) signal, a D2D discovery signal, etc. may be stopped. In this case, whether synchronization is established can be indicated through a higher layer parameter.

As another example, in case that a D2D communication signal and a D2D discovery signal overlap with each other in a subframe for D2D signal transmission, transmission and reception of the D2D discovery signal may be stopped.

Moreover, in case that a signal between a UE and an eNB overlaps with a D2D signal, the signal between the UE and the eNB may have priority. In this case, transmission and reception of the D2D signal may be dropped or stopped.

Furthermore, in case that a different UE receives a synchronization signal, i.e., if the corresponding synchronization signal is detected by a neighboring UE, the neighboring UE may stop reserved D2D transmission and reception operations.

In this case, the UE may report UE's capability to the eNB as described with reference to FIG. 13. Here, the capability of the UE may mean that the UE can transmit and receive different signals through a band for D2D signal transmission and reception. Particularly, the capability report may contain an upper limit of a transmission timing difference between a signal for the eNB and a D2D signal, the transmission timing difference between the signal for the eNB and the D2D signal, or whether the corresponding UE can simultaneously transmit a plurality of signals (or whether the UE can have a capability of supporting the corresponding timing difference). Moreover, the capability report may include a field for indicating a band capable of simultaneous reception or transmission, a filed for indicating a D2D transmission and reception band, etc. Further, the UE may transmit the capability report to the eNB during the initial procedure for accessing the network.

After receiving the above report, the eNB estimates whether the corresponding UE can simultaneously transmit the signal for the eNB and the D2D signal. If determining that the corresponding UE cannot simultaneously transmit the signal for the eNB and the D2D signal, the eNB may be configured not to schedule transmission of the uplink signal to the eNB at a timing at which the D2D signal transmission is expected in spite of the same carrier or different carrier. On the contrary, the eNB may be configured not to schedule transmission and reception of the D2D signal.

To transmit the report to the eNB, the UE may use separate signaling for explicit indication. Alternatively, the UE may utilize an existing signal for implicit indication. As an example of the explicit indication, the UE may inform the eNB of whether the UE can simultaneously transmit and receive the two signals as information with respect to the capability.

Figure 16:
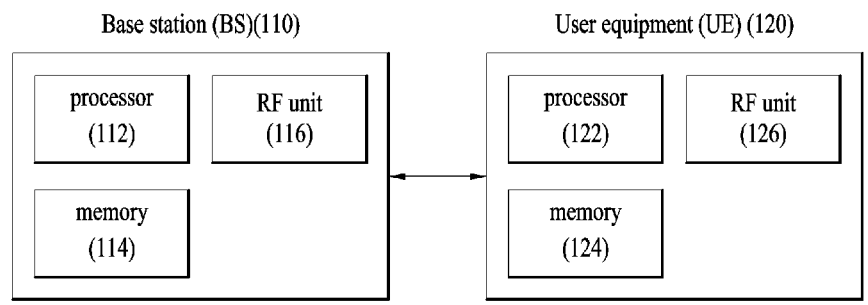
FIG. 16 is a block diagram of transmitting and receiving devices applicable to the present invention.

In addition, when the above signals overlap with each other, the matters described in the aforementioned method for transmitting and reception D2D and WAN signals can be applied. For example, if an overlapping interval between the signals is smaller than a predetermined threshold or upper limit, some of low priority signals may be transmitted. In this case, if the low priority signal is determined as an unimportant signal by considering a type of the low priority signal, a part of the signal can be transmitted instead of dropping the entirety of the signal. FIG. 16 illustrates a BS and a UE applicable to an embodiment of the present invention. In a system including a relay, the BS and the UE may be replaced with the relay.

Referring to FIG. 16, a wireless communication system includes the BS 110 and the UE 120. The BS 110 includes a processor 112, a memory 114, and a radio frequency (RF) unit 116. The processor 112 may be configured to implement the procedures and/or methods proposed by the present invention. The memory 114 is connected to the processor 112 and stores various types of information related to operation of the processor 112. The RF unit 116 is connected to the processor 112 and transmits and/or receives radio signals. The UE 120 includes a processor 122, a memory 124, and an RF unit 126. The processor 122 may be configured to implement the procedures and/or methods proposed by the present invention. The memory 124 is connected to the processor 122 and stores various types of information related to operation of the processor 122. The RF unit 126 is connected to the processor 122 and transmits and/or receives radio signals. The BS 110 and/or the UE 120 may have a single antenna or multiple antennas.

The above-described embodiments are combinations of elements and features of the present invention in a predetermined manner. Each of the elements or features may be considered selective unless mentioned otherwise. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. In the appended claims, claims that are not explicitly dependent on each other may of course be combined to provide an embodiment or new claims can be added through amendment after the application is filed.

In the present disclosure, embodiments of the present invention are described centering on the data transmission/reception relations between a user equipment and a base station. In this disclosure, a specific operation explained as performed by a base station can be performed by an upper node of the base station in some cases. In particular, in a network constructed with a plurality of network nodes including a base station, it is apparent that various operations performed for communication with a user equipment can be performed by a base station or other network nodes except the base station. The base station may be replaced with terms such as a fixed station, Node B, eNode B (eNB), and access point. Also, the user equipment may be replaced with terms such as mobile station (MS) and mobile subscriber station (MSS).

The embodiments of the present invention may be implemented using various means. For instance, embodiments of the present invention may be implemented using hardware, firmware, software and/or any combinations thereof. In case of the implementation by hardware, one embodiment of the present invention may be implemented by one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be driven by a processor. The memory unit may be provided within or outside the processor to exchange data with the processor through the various means known to the public.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention may be used in a wireless communication apparatus, such as a user equipment, a relay, or a base station.

What is claimed is:
1. A method for transmitting a signal by a user equipment (UE) in a wireless communication system supporting device-to-device (D2D) communication, the method comprising:
    reserving a first uplink resource on a first frequency band for transmission of a first signal;
    reserving a second uplink resource on a second frequency band for transmission of a second signal, wherein the second uplink resource is overlapped in time with the first uplink resource; and when the UE is not capable of simultaneous transmission on the first frequency band and the second frequency band, transmitting the first signal, wherein each of the first signal and the second signal is a signal to an eNodeB, a D2D synchronization signal, a D2D control signal or other D2D communication signal, wherein the first signal is determined based on a predetermined priority in an order of the signal to the eNodeB, the D2D synchronization signal, the D2D control signal, and the other D2D communication signal, and wherein, when the second signal is the D2D synchronization signal and symbols of the D2D synchronization signal do not directly overlap symbols for the first signal, the UE also transmits the symbols of the D2D synchronization signal that do not directly overlap symbols for the first signal.

2. The method according to claim 1, wherein timing of the first resource and the second resource is different from each other.

3. The method according to claim 2, wherein the first resource has a timing for which a timing advance command is applied, and wherein the second resource has a timing for which a timing advance command is not applied.

4. The method according to claim 1, wherein the first uplink resource and the second uplink resource comprise a same subframe with respect to time.

5. A user equipment (UE) for transmitting a signal in a wireless communication system supporting device-to-device (D2D) communication, the UE comprising:

a transceiver configured to transmit the signal; and a processor configured to support the D2D communication, wherein the processor is configured to:

reserve a first uplink resource on a first frequency band for transmission of a first signal and to reserve a second uplink resource on a second frequency band for transmission of a second signal, wherein the second uplink resource is overlapped in time with the first uplink resource, and when the UE is not capable of simultaneous transmission on the first frequency band and the second frequency band, control the transceiver to transmit the first signal, wherein the first signal and the second signal are a signal to an eNodeB, a D2D synchronization signal, a D2D control signal, or other D2D communication signal, wherein the first signal is determined based on predetermined priority in an order of the signal to the eNodeB, the D2D synchronization signal, the D2D control signal, and the other D2D communication signal, and wherein, when the second signal is the D2D synchronization signal and symbols of the D2D synchronization signal do not directly overlap symbols for the first signal, the UE also transmits the symbols of the D2D synchronization signal that do not directly overlap symbols for the first signal.

6. The UE of claim 5, wherein timing of the first resource and the second resource is different from each other.

7. The UE of claim 6, wherein the first resource has a timing for which timing advance command is applied, and wherein the second resource has a timing for which a timing advance command is not applied.

8. The UE of claim 5, wherein the first uplink resource and the second uplink resource comprise a same subframe with respect to time.

* * * * *